US006999426B2

(12) United States Patent
Miyoshi

(10) Patent No.: US 6,999,426 B2
(45) Date of Patent: Feb. 14, 2006

(54) DATA BUS CONTROL METHOD FOR ARTIFICIAL SATELLITE LOAD AND SYSTEM THEREOF

(75) Inventor: Hiroaki Miyoshi, Tokyo (JP)

(73) Assignee: NEC Toshiba Space Systems, (JP)

(*) Notice: Subject to any disclaimer, the term of this patent is extended or adjusted under 35 U.S.C. 154(b) by 674 days.

(21) Appl. No.: 09/760,584

(22) Filed: Jan. 16, 2001

(65) Prior Publication Data
US 2001/0014084 A1 Aug. 16, 2001

(30) Foreign Application Priority Data
Jan. 19, 2000 (JP) ............................ 2000-010771

(51) Int. Cl.
H04B 4/185 (2006.01)
H04J 3/16 (2006.01)

(52) U.S. Cl. .................... 370/316; 370/321; 370/346; 370/455

(58) Field of Classification Search ................ 370/316, 370/427, 449, 345, 346, 347, 321, 329, 437, 370/455, 465, 476
See application file for complete search history.

(56) References Cited

U.S. PATENT DOCUMENTS

| | | | | |
|---|---|---|---|---|
| 5,295,140 A | * | 3/1994 | Crisler et al. | ................ 370/443 |
| 5,297,144 A | * | 3/1994 | Gilbert et al. | ............... 370/346 |
| 5,790,535 A | * | 8/1998 | Kou | ............................ 370/337 |
| 5,790,568 A | | 8/1998 | Luong et al. | |
| 6,625,154 B1 | * | 9/2003 | Murata | .................... 370/395.4 |
| 6,658,009 B1 | * | 12/2003 | Yamashita et al. | ..... 370/395.65 |

FOREIGN PATENT DOCUMENTS

| | | |
|---|---|---|
| DE | 19804701 | 8/1999 |
| EP | 0276349 | 2/1987 |
| GB | 2097564 | 11/1982 |
| GB | 2334414 | 8/1999 |
| JP | 63-123792 | 3/1990 |
| JP | 03-44234 | 2/1991 |
| JP | 06-90240 | 3/1994 |
| JP | 09-27989 | 1/1997 |
| JP | 09-130383 | 5/1997 |
| JP | 09-238155 | 9/1997 |

OTHER PUBLICATIONS

Japanese Office Action dated Mar. 26, 2003 (w/ English translation of relevant portion).

* cited by examiner

Primary Examiner—Afsar Qureshi
(74) Attorney, Agent, or Firm—Dickstein, Shapiro, Morin & Oshinsky, LLP.

(57) ABSTRACT

A periodical processing time band during which communication is periodically conducted between a plurality of communication terminals and a data bus control apparatus and a nonperiodical processing time band during which communication is nonperiodically conducted between the plurality of terminals and the data bus control apparatus are independently provided, priority communication during each nonperiodical processing time band are determined in advance. Based on a schedule, collection of communication requests to the communication terminals for conducting communication with priority during the nonperiodical processing time band is conducted, and when communication requests from the communication terminals exist, transmission is allowed if data content to be transmitted is below or equal to an allocated allowable band, and one variable length packet is transmitted from the communication terminal during the nonperiodical processing time band, and the transmission is suppressed if it is above or equal to the allocated allowable band.

12 Claims, 7 Drawing Sheets

DATA BUS CONTROL METHOD FOR ARTIFICIAL SATELLITE LOAD AND SYSTEM THEREOF

BACKGROUND OF THE INVENTION

The present invention relates to a control technology of a data bus for an artificial satellite load, which is used for data communication between devices which are loaded in artificial satellites, and for transmission and reception of a command and a telemetry data from a ground station for controlling artificial satellite control, and especially to a data bus control method for an artificial satellite load and a system thereof for making possible not only conventional fixed periodical and fixed length data communication but also non-periodical and variable length packet data communication.

A conventional artificial satellite data bus system will be explained by referring to FIG. 1.

In FIG. 1, in the conventional satellite data bus system, a telemetry data collected by means of a data bus control apparatus 1 from each of devices $3_1$–$3_n$ loaded in satellites is time-divided and multiplexed by means of a pulse code modulation (PCM) system, and is transmitted to a ground station.

However, in this artificial satellite data bus system by means of the PCM frame system, there are the following tasks:

The first task is that, since specific telemetry of the devices $3_1$–$3_n$ loaded in satellites is transmitted to a ground station by means of a specific fixed-time time slot which comes every fixed period, only fixed length (usually 8 bits) telemetry data can be transmitted.

The second task is that, since by means of the specific time slot the data bus control device 1 must always transmit the specific telemetry of the certain devices $3_1$–$3_n$ loaded in satellites, all of transmission orders and timing should be determined prior to launch of a satellite, and accordingly, flexibility of communication is missing.

In interactive type communication between computers, there are many cases in which comparatively short information is exchanged and data processing is conducted. In these cases, since, in the conventional data bus system until a series of processing is completed, a transmission line is kept connected within a time period during which information is not actually sent, for example, within a time period during which a computer is operating, it provides disadvantage from a data bus band efficient utilization point of view.

As other data bus system, there is an ethernet system which is utilized so much in a local area network (LAN) on the ground, and according to this system, since a variable length packet can be irregularly output, it provides advantage from a data bus band efficient utilization and communication flexibility point of view, and however, since, at the same time, collision on the bus can occur because a plurality of nodes start communication, there is a possibility that a command and so forth which should be surely transmitted real time are erased, and accordingly, there are several tasks from a communication reliability point of view.

SUMMARY OF THE INVENTION

The present invention is made to solve the above-mentioned problems.

Moreover, the objective of the present invention is to provide a variable length and non-periodical packet transmission and reception function to a data bus system which is loaded in an artificial satellite, in addition to the conventional regular and fixed length telemetry collection function.

Moreover, the objective of the present invention is to provide a data bus control technology for an artificial satellite load, capable of transmitting a non-periodical and variable length packet, which can be realized by means of less processing capability of the data bus control apparatus.

Moreover, the objective of the present invention is to provide a data bus control technology for an artificial satellite load, capable of conducting efficient transmission independently of a characteristic of a packet which is transmitted from a communication terminal.

The above-described objectives of the present invention are accomplished by a data bus control method for an artificial satellite load, which controls data communication between a plurality of communication terminals and a data bus control apparatus, characterized in that a periodical processing time band during which communication is periodically conducted between the plurality of communication terminals and the data bus control apparatus and a non-periodical processing time band during which communication is non-periodically conducted between the above-described plurality of communication terminals and the above-described data bus control apparatus are independently provided, and data transmission is conducted at a variable length packet unit during the above-described non-periodical processing time band.

In addition, as a preferable embodiment of the above-described present invention, it is preferable that collection of communication requests (polling) during the non-periodical processing time band from the plurality of communication terminal is time-divisionally conducted.

Also, as a preferable embodiment of the above-described present invention, it is preferable that communication terminals for conducting communication with priority during each non-periodical processing time band are previously determined and a schedule is made out, and based on the above-described schedule, processing of a communication request is conducted.

Also, as a preferable embodiment of the above-described present invention, it is preferable that, in case that communication requests from the communication terminals for conducting communication with priority during the non-periodical processing time band do not exist, the above-described non-periodical time band is allocated to communication with other communication terminals.

Also, as a preferable embodiment of the above-described present invention, it is preferable that the communication requests from the communication terminals, which are conducted during the non-periodical processing time band, are averaged by a time period during which transmission of a plurality of packets is conducted.

The above-described objectives of the present invention are accomplished by a data bus control method for an artificial satellite load, which controls data communication between a plurality of communication terminals and a data bus control apparatus, characterized in that the method comprises steps of:

independently providing a periodical processing time band during which communication is periodically conducted between the plurality of communication terminals and the data bus control apparatus and a non-periodical processing time band during which communication is non-periodically conducted between the above-described plurality of communication terminals and the above-described data bus control apparatus;

allocating an allowable band in the above-described non-periodical processing time band to each communication terminal;

time-dividing collection of communication requests (polling) to each communication terminal during the above-described non-periodical processing time band, and previously determining communication terminals for conducting communication with priority during each non-periodical processing time band and making out a schedule;

conducting collection of communication requests (polling) to communication terminals for conducting communication with priority during the above-described non-periodical processing time band, based on the above-described schedule;

as a result of the collection of the communication requests, in case that the communication requests from the communication terminals exist, allowing transmission if a data content to be transmitted, which is averaged by a time period during which transmission of a plurality of packets is conducted, is below or equal to the above-described allocated allowable band, and suppressing transmission if it is above or equal to the above-described allocated allowable band; and transmitting one variable length packet from the communication terminal in one non-periodical processing time band during which transmission is allowed.

In addition, it is preferable that determination of the above-described transmission allowance is determined based on an equation below, $$L(n)+L(n+1)+ \ldots +L(n+m) \leq BWalloc \times Tmp$$

where BWalloc is the allocated allowable band,
L(n) is the n-th packet length, and
Tmp is a time period until the communication terminal can set the (n+m)-th packet transmission request since it sets the n-th packet transmission request.

Also, as a preferable embodiment of the above-described present invention, it is preferable that the method further comprises a step of allocating the above-described non-periodical time band to communication with other communication terminals in case that communication requests from the communication terminals for conducting communication with priority during the above-described non-periodical processing time band do not exist.

The objectives of the above-described present invention are accomplished by a data bus control system for an artificial satellite load, which controls data communication between a plurality of communication terminals and a data bus control apparatus, characterized in that a periodical processing time band during which communication is periodically conducted between the plurality of communication terminals and the data bus control apparatus and a non-periodical processing time band during which communication is non-periodically conducted between the above-described plurality of communication terminals and the above-described data bus control apparatus are independently provided, and the system comprises:

a schedule table in which numbers of communication terminals for conducting communication with priority during each non-periodical processing time period are described;

means for conducting collection of communication requests (polling) to the communication terminals having the numbers which are described in the above-described schedule table;

control means for, in case that the communication requests from the above-described communication terminals exist, allowing transmission if a data content to be transmitted, which is averaged by a time period during which transmission of a plurality of packets is conducted, is below or equal to an allowable band allocated to the above-described communication terminals, and suppressing transmission if it is above or equal to the above-described allocated allowable band; and means for allowing transmission of one variable length packet during a non-periodical processing time band of the above-described communication terminal in case that the transmission is allowed.

In addition, it is preferable that the above-described control means conducts determination based on an equation below, $$L(n)+L(n+1)+ \ldots +L(n+m) \leq BWalloc \times TmP$$

where BWalloc is the allocated allowable band,
L(n) is the n-th packet length, and
Tmp is a time period until the communication terminal can set the (n+m)-th packet transmission request since it sets the n-th packet transmission request.

Also, as a preferable embodiment of the above-described present invention, it is preferable that the system further comprises means for allocating the above-described non-periodical time band to communication with other communication terminals in case that communication requests from the communication terminals for conducting communication with priority during the above-described non-periodical processing time band do not exist.

The above-described present invention is characterized in that the non-periodical communication processing schedule table is provided, in which the numbers of the communication terminals for conducting communication with priority during the non-periodical processing time period that is periodically repeated are described, and only one packet transmission is allowed during one non-periodical processing time period. In other words, the maximum length exists in a packet which can be transmitted, and it becomes to be the maximum packet length (referred to an MTU: Maximum Transmission Unit, hereinafter) which can be transmitted within the non-periodical processing time period.

In the above-described non-periodical communication processing schedule table, the number of the communication terminal for conducting communication first is fixedly allocated to each non-periodical processing time period, and the data bus control apparatus has a function in which the numbers of the communication terminals that should communicate with each other are easily obtained during the non-periodical processing time period in accordance with the non-periodical communication schedule table.

Accordingly, the data bus control apparatus not only can reduce processing necessary for determining the communication terminals that should communicate with each other during a certain non-periodical processing time period, but also can efficiently handle non-periodical packet transfer transaction in a common use manner similarly to the conventional system by previously reflecting non-uniformity of allocated band contents between the communication terminals in the non-periodical communication schedule table (by allocating the non-periodical communication processing period per unit time period more to a communication terminal having a large allocated band).

Also, in the data bus control apparatus in accordance with the present invention, since, by calculating determination of an excess of an allocated band by means of $$L(n)+L(n+1)+ \ldots +L(n+m) \leq BWalloc \times TmP$$

packet transmission requests from the communication terminals are averaged at a time interval during which transmission of a plurality of packets is conducted, non-uniformity of a characteristic of a packet occurrence frequency from the communication terminals can be flexibly handled. In addition, in the equation, BWalloc is the allocated allowable band, L(n) is the n-th packet length, and TmP is a time period until the communication terminal can set the (n+m)-th packet transmission request since it sets the n-th packet transmission request.

BRIEF DESCRIPTION OF THE INVENTION

This and other objects, features, and advantages of the present invention will become more apparent upon a reading of the following detailed description and drawings, in which.

DESCRIPTION OF THE EMBODIMENTS

Figure 1:
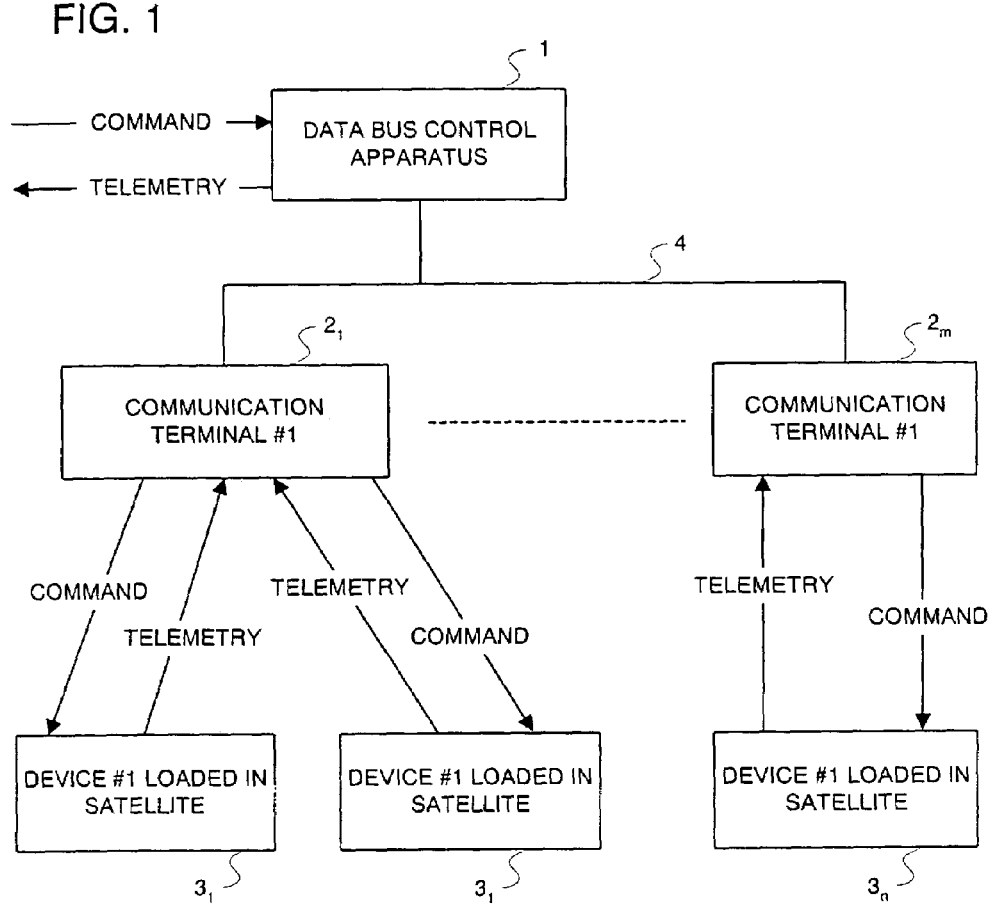
FIG. 1 is a view showing a data bus system for an artificial satellite load as one embodiment of the present invention.

An embodiment of the present invention will be explained in detail referring to the drawings.

FIG. 1 is a view showing a data bus system for an artificial satellite load as one embodiment of the present invention.

In FIG. 1, 1 is a data bus control apparatus, $2_1$–$2_m$ are communication terminals, $3_1$–$3_n$ are devices loaded in satellites, and 4 is a data bus.

Through the data bus 4 and the communication terminals $2_1$–$2_m$ the data bus control apparatus 1 conducts distribution of commands for control of the devices $3_1$–$3_n$ loaded in satellites, which are received from a ground station, and collection control of a telemetry data for showing operating condition of the devices $3_1$–$3_n$ loaded in satellites.

All communication on the data bus 4 is started by means of a command from the data bus control apparatus 1, which has a certain defined form.

In accordance with a data transmission command transmitted from the data bus control apparatus 1 by way of the data bus 4, the communication terminals $2_1$–$2_m$ transmit to the data bus control apparatus 1 the telemetry data from the devices $3_1$–$3_n$ loaded in satellites. Also, in accordance with a data reception command, the commands for control of the devices $3_1$–$3_n$ loaded in satellites are received, and are transmitted to the devices $3_1$–$3_n$ loaded in satellites.

Here, an arrangement of the data bus control apparatus 1 will be explained further in detail.

Figure 2:
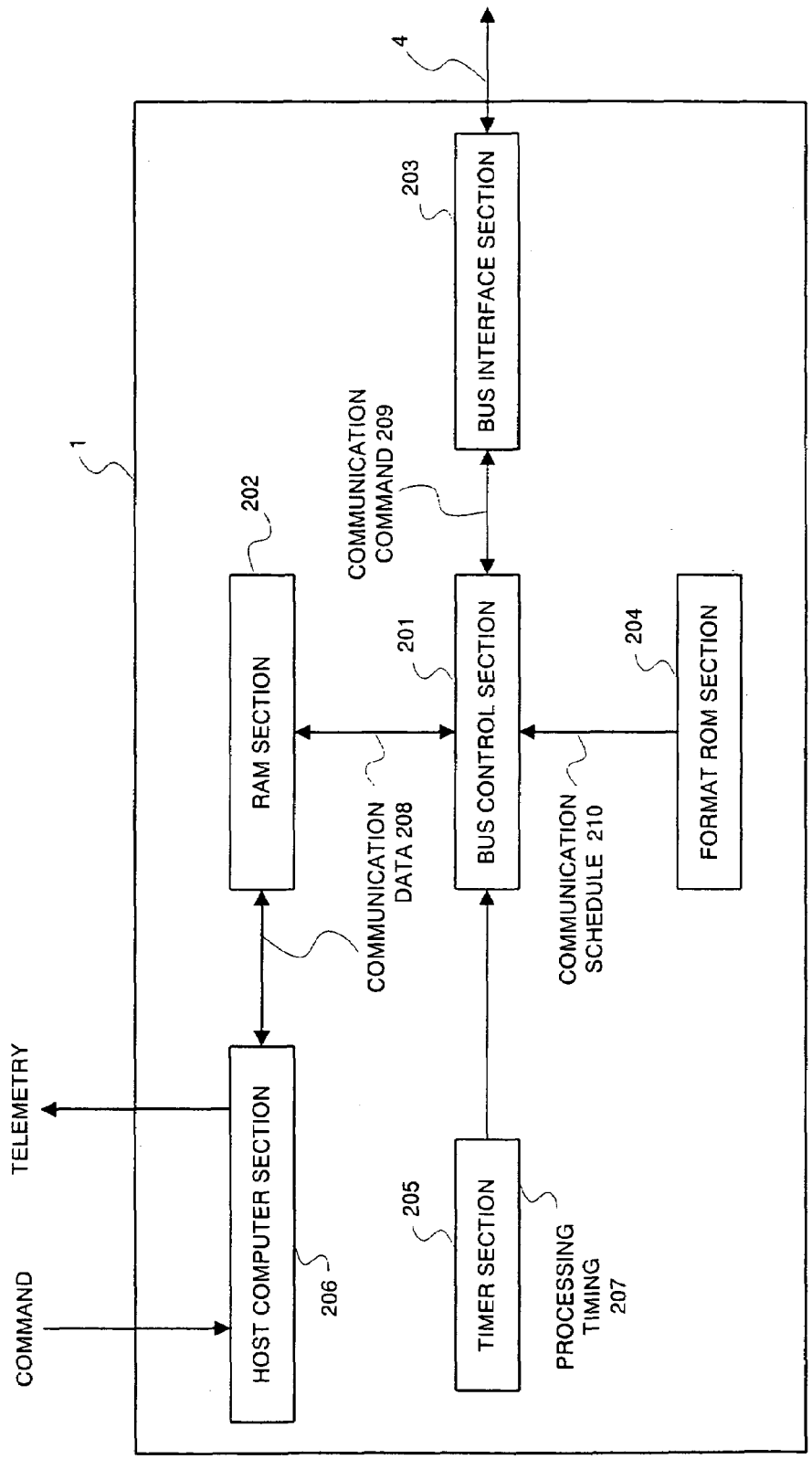
FIG. 2 is an arrangement view showing an arrangement of a data bus control apparatus 1.

FIG. 2 is an arrangement view showing an arrangement of the data bus control apparatus 1.

The data bus control apparatus 1 is constructed of a bus control section 201, a readable and writable memory (RAM) section 202, a bus interface section 203, a format ROM section 204, a timer section 205 and a host computer 206.

The bus control section 201 includes a number of programmed condition machines, and performs a series of data transfer operations based on a processing timing signal 207 from the timer section 205. Further, the bus control section 201 also has a function for outputting a synchronizing command for showing ends of processing timing to the communication terminals $2_1$–$2_m$, a non-periodical packet communication request collection (polling) command, and a non-periodical packet communication ending command, in addition to a command that is used for a purpose of data transmission and reception.

The RAM section 202 temporarily stores a communication data 208 that is transmitted and received through a data bus, and fills the role of a buffer with the host computer 206.

The bus interface section 203 adjusts an electric level of a communication command 209 of data transmission and reception and so forth, which is output from the bus control section 201, and conducts transmission and reception with the communication terminals $2_1$–$2_m$ through the data bus 4.

The format ROM section 204 is used for storing a communication schedule 210 of data transmission and reception and so forth, which is periodically executed on the data bus, and the schedule is read and used by the bus control section 201.

The timer section 205 generates a processing timing signal 207 for data bus communication.

Figure 3:
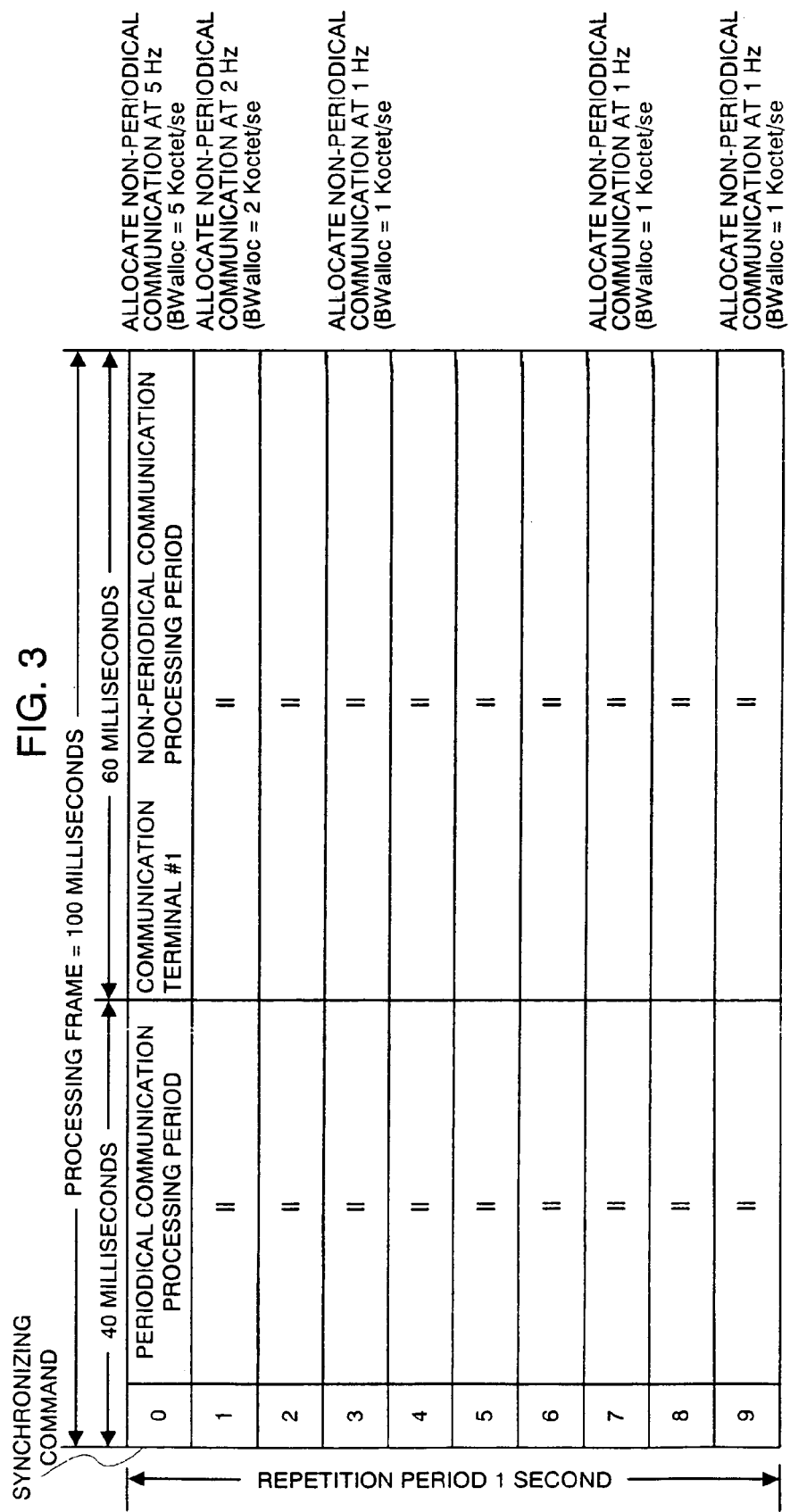
FIG. 3 is a view showing an example of a non-periodical communication processing schedule table.

The host computer section 206 is a computer for conducting application control of a satellite via the data bus, and conducts editing and transmission processing of telemetry to a ground station, and reception and execution processing of a command from the ground station. Also, the host computer 206 has a non-periodical communication schedule table 211 therein. As shown in FIG. 3, this non-periodical communication processing schedule table 211 is a table in which numbers of the communication terminals that should communicate with each other with priority during each non-periodical processing time period are described. The bus control section 201 can easily obtain the numbers of the communication terminals that should communicate with each other during the above-described non-periodical processing time period, by means of the non-periodical communication schedule table 211.

During the periodical communication processing period, the system statically distributes communication band to each communication terminal in accordance with a schedule set in the format ROM section.

Additionally, the system defines a packet length capable of conducting transmission and reception within non-periodical communication processing time periods as the maximum packet length. The system further conducts transmission of only one packet within one non-periodical communication processing time period.

Subsequently, the communication terminals $2_1$–$2_m$ will be explained further in detail.

Figure 4:
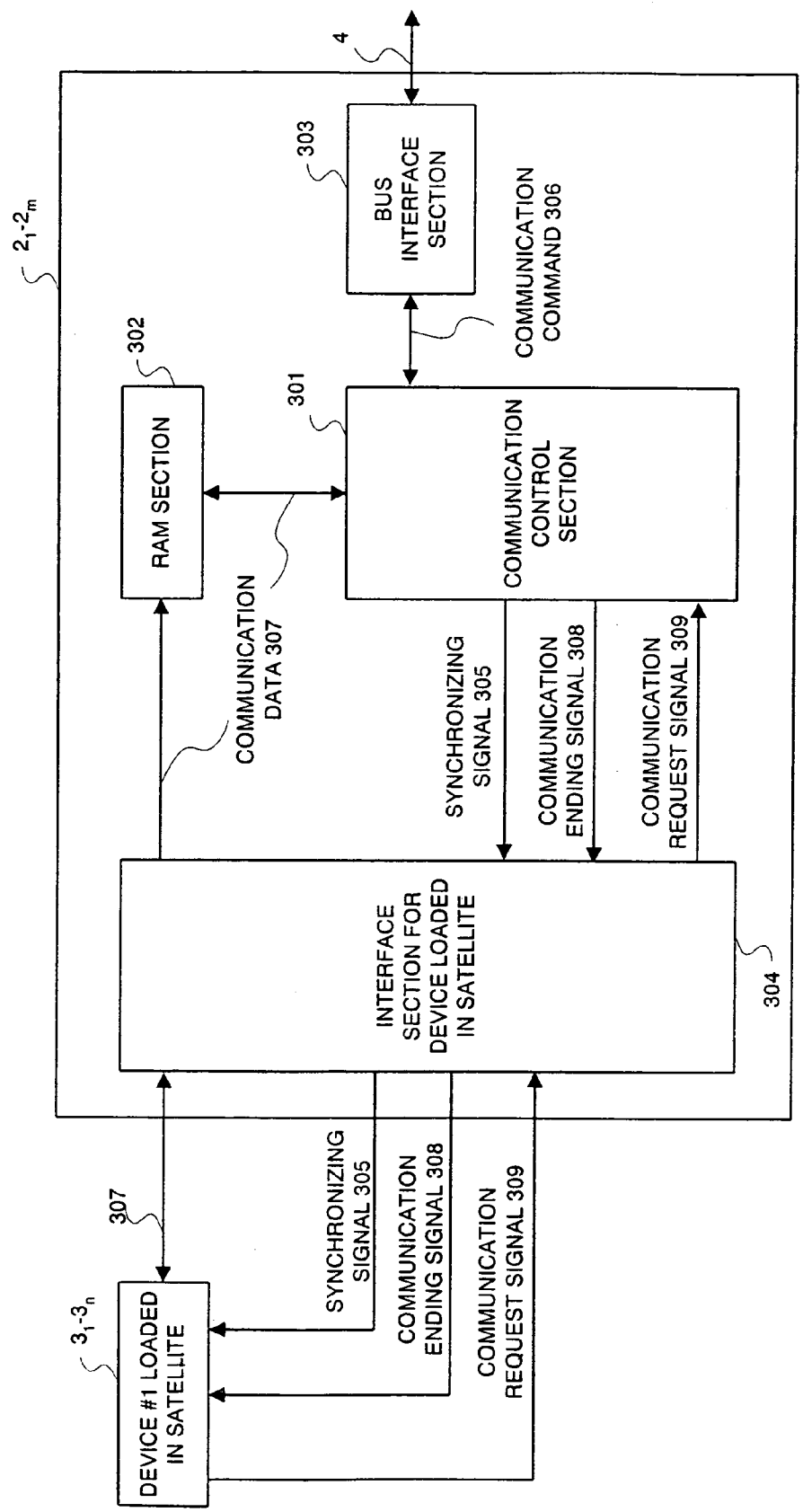
FIG. 4 is an arrangement view showing an arrangement of communication terminals $2_1$–$2_m$.

FIG. 4 is an arrangement view showing an arrangement of the communication terminals $2_1$–$2_m$.

The communication terminals $2_1$–$2_m$ are constructed of a communication processing section 301, a readable and writable memory (RAM) section 302, a bus interface section 303, and an interface section 304 for a device loaded in a satellite.

The communication processing section 301 deciphers several kinds of commands 306 from the data bus control apparatus 1, which are transmitted by way of the data bus 4, and conducts transmission and reception of a data with the RAM section 302 if it is a data transmission and reception command, and outputs a synchronizing signal 305 to the interface section 304 for a device loaded in a satellite if it is a synchronizing command, and outputs a communication ending signal 308 to the interface section 304 for a device loaded in a satellite if it is a communication ending command. Also, the communication processing section transfers a communication request signal 309 from the devices $3_1$–$3_n$ loaded in satellites to the data bus control apparatus 1.

The RAM section 302 temporarily accumulates a communication data 307 in association with a data transmission command from the data bus processing section 1, and is used for a buffer with the devices $3_1$–$3_m$ loaded in satellites. Typically, a variable length packet that is transmitted during a non-periodical communication time period is stored.

The bus interface section 303 conducts mutual conversion between an electric level used for data transmission and reception on the data bus 4 and an electric level used within the communication terminal 2.

The interface section 304 for a device loaded in a satellite conducts interface with respect to the communication data 307 with the RAM section 302, and with respect to the synchronizing signal 305, the communication request signal 309 and the communication ending signal 308 with the communication control section 301, and inputs and outputs these information to and from the devices $3_1$–$3_n$ loaded in satellites.

Next, an operation of the data bus system for an artificial satellite load in this embodiment will be explained.

Figure 5:
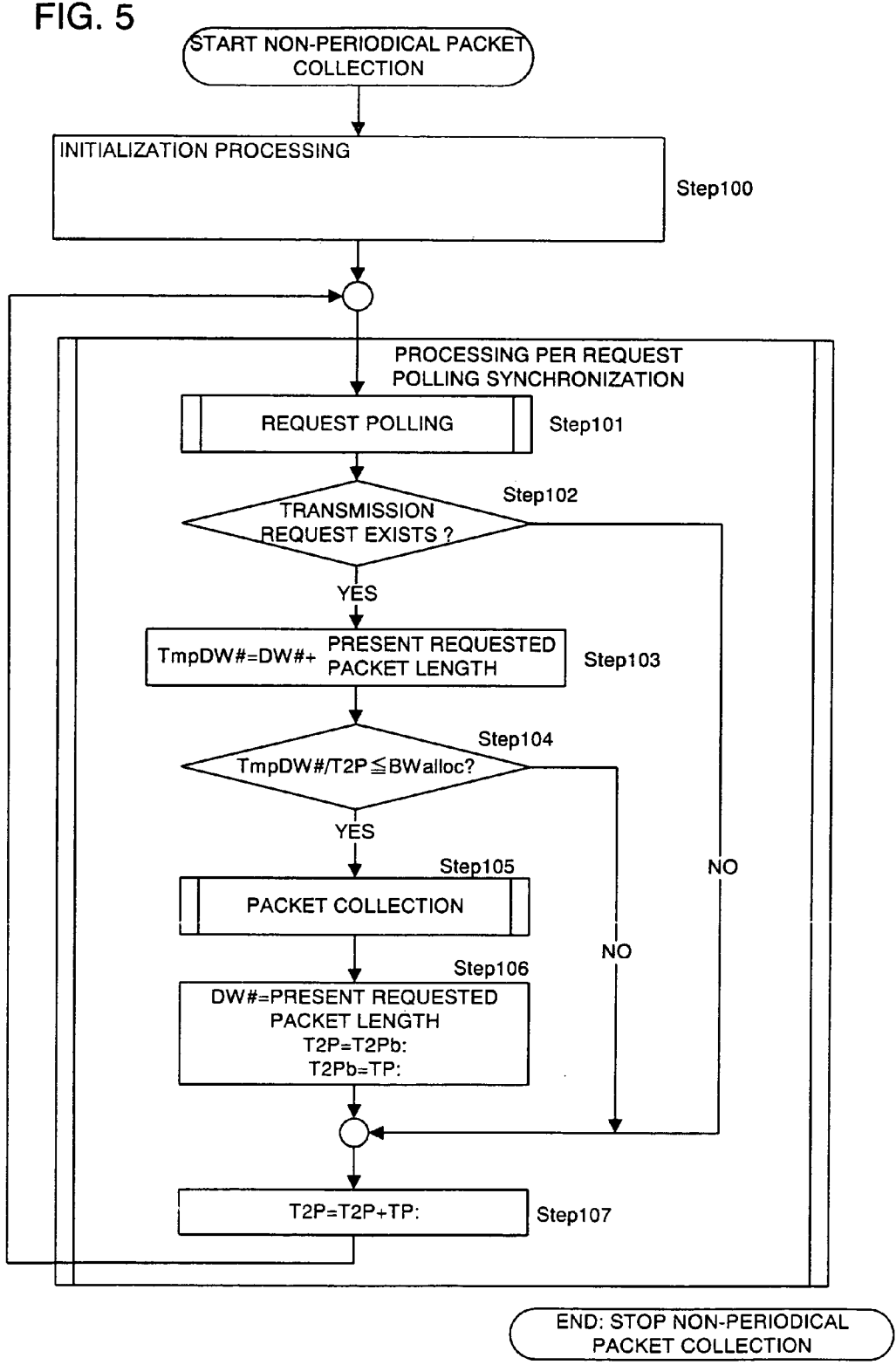
FIG. 5 is a particular processing flow in the data bus control apparatus 1 in this embodiment.
Figure 6:
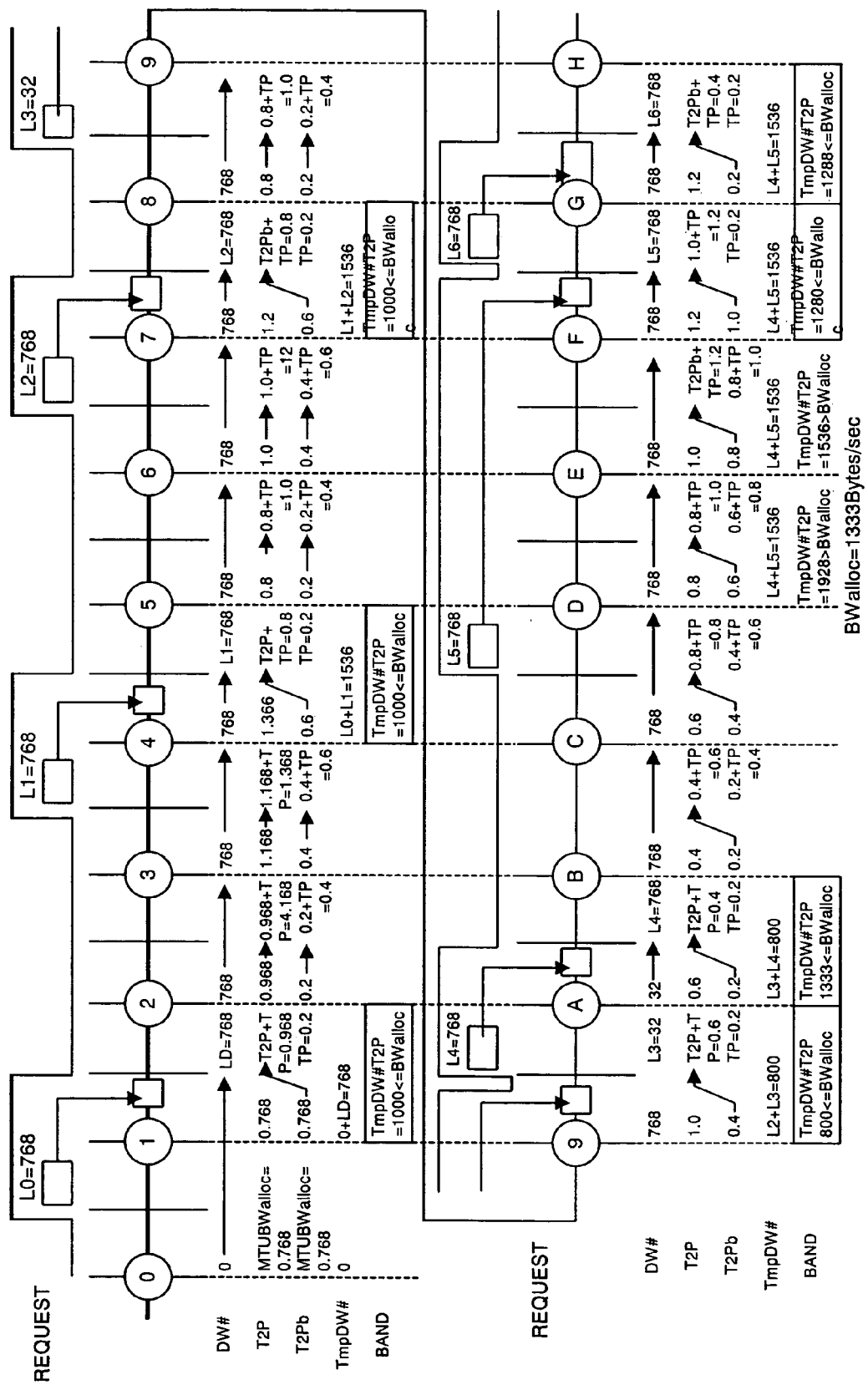
FIG. 6 is a time chart when the data bus control apparatus collects packets from a communication terminal #1 and FIG. 7 is a flow chart in another embodiment.

FIG. 5 is a particular processing flow in the data bus control apparatus 1 in this embodiment, and FIG. 6 is a time chart when the data bus control apparatus collects packets from a communication terminal #1. Below, using FIG. 5 and FIG. 6, a flow of non-periodical packet communication processing in this embodiment will be explained. In addition, in the explanation of this embodiment, it is assumed that the non-periodical communication schedule shown in FIG. 3 is used for a non-periodical communication processing schedule table. And, according to the non-periodical communication processing schedule table, it is assumed that ten processing frames are constructed as one unit, and that non-periodical communication processing time periods are allocated to the communication terminal #1 with a period of 5 Hz, to the communication terminal #2 with a period of 2 Hz, and to the communication terminals #4–6 with a period of 1 Hz. In this case, if an MTU is assumed to be 1024 octets, it becomes to be possible to set at maximum 5120 Bytes/sec, 2048 Bytes/sec and 1024 Bytes/sec for BWalloc, respectively.

Also, in this embodiment, it is assumed that averaging of non-periodical packet transmission requests from the communication terminals $2_1$–$2_m$ during a non-periodical communication processing time band is conducted by two packets. During the non-periodical communication processing time period, the data bus control apparatus 1 obtains the communication terminals for collecting the requests based on the non-periodical communication schedule table, and conducts polling on whether the non-periodical packet transmission requests from the above-described communication terminals exist, and in case that the requests exist, existence of an excess of an allocated band is determined in accordance with an equation (1) below.

$$L(n)+L(n+1) \leq BWalloc \times T2P \qquad (1)$$

In addition, in the equation (1), BWalloc is the allocated allowable band, L(n) is the n-th packet length, and T2P is a time period until the communication terminal can set the second packet transmission request since it sets the n-th packet transmission request.

A processing flow of FIG. 5 will be explained by applying the above-mentioned conditions.

First, initialization processing is conducted (STEP 100). In this initialization processing, for an initial value (T2P, T2Pb) for the calculation of an excess of the allocated band, the data bus control apparatus 1 uses a value calculated from MTU/BWalloc. In addition, T2P is a time period until the communication terminal can set the (n+2)-th packet transmission request since it sets the n-th packet transmission request, and T2Pb is a time period until the communication terminal can set the (n+2)-th packet transmission request since it sets the (n+1)-th packet transmission request.

During the initialization processing at step 100: DW# (Number of Transmission data)=0 T2P [P(N)–P(N+2) Request Interval #1 ]=MTU/BWalloc T2Pb [P(N)–P(N+2) Request Interval #2 ]=MTU/BWalloc Subsequently, polling is conducted to the communication terminals for conducting communication with priority in accordance with the non-periodical communication schedule (STEP 101).

In case that the transmission requests exist (STEP 102), packet length for requesting transmission is acquired (STEP 103). And, existence of an excess of the allocated band is determined based on the equation (1) (STEP 104). On the other hand, in case that the transmission requests do not exist (STEP 102), a value of T2P is renewed (STEP 107)

As a result of the determination, in case that the excess does not exist, packets are collected from the communication terminals (STEP 105). And, T2P and T2Pb are reset (STEP 106), and a value of T2P is renewed (STEP 107). On the other hand, as a result of the determination, in case that the excess exists, packet collection during the non-periodical communication time period is suppressed, and a value of T2P is renewed (STEP 107)

Subsequently, by taking the communication terminal #1 as an example, a more particular operation will be explained using a time chart of FIG. 6. In addition, it is assumed that the communication terminal #1 has a characteristic that it periodically outputs a packet of 768 octets at a 0.6 second period, and outputs a short response packet at an arbitrary period. Also, although at maximum 5120 Bytes/sec can be allocated to BWalloc, by taking a margin, (768+32)/0.6=1333 Bytes/sec is assumed for BWalloc.

FIG. 6 is a time chart of a 0.1 sec unit, and symbols from 1 to H indicate timings of polling for the communication terminal #1, and L0–L6 indicate packet length to be transmitted, and T2P indicates a time period until the communication terminal #1 can set the (n+2)-th packet transmission request since it sets the n-th packet transmission request.

First, since, for an initial value (T2P, T2Pb) for the calculation of an excess of the allocated band, the data bus control apparatus 1 uses a value calculated from MTU/BWalloc, the first packet is always collected at a processing frame in which polling is applied to the requests (timing ① in FIG. 6). The communication terminal #1 requests transmission of the next packet L1=768 octets at the next periodical packet output period (timing ④ in FIG. 6). And, in the data control apparatus, the calculation of an excess of a band from the communication terminals is conducted based on the equation (1). Then, (L0+L1)/T2P=1536/1.368=1123 BWalloc=1333, and since it is within the band, the transmission is allowed.

Subsequently, in case that a transmission request of L2=768 octets exists at timing ⑦ in FIG. 6, similarly to the above, the calculation of an excess of a band is conducted based on the equation (1). Then, (L1+L2)/T2P=1536/1.2=1280 Bwalloc=1333, and since it is within the band, the transmission is allowed.

Subsequently, in case that a transmission request of L3=32 octets exists at timing ⑨ in FIG. 6, similarly to the above, the calculation of an excess of a band is conducted based on the equation (1). Then, (L2+L3)/T2P=800/1.0=800 Bwalloc=1333, and since it is within the band, the transmission is allowed.

Subsequently, in case that a transmission request of L4=768 octets exists at timing A in FIG. 6, similarly to the above, the calculation of an excess of a band is conducted based on the equation (1). Then, (L3+L4)/T2P=800/1.0=800 Bwalloc=1333, and since it is within the band, the transmission is allowed.

Subsequently, in case that a transmission request of L5=768 octets exists at timing D in FIG. 6, similarly to the above, the calculation of an excess of a band is conducted based on the equation (1). Then, (L4+L5)/T2P=1536/0.8=1920>Bwalloc=1333, and since it exceeds the allowable band, until it becomes to be within the allowable band the transmission requests are suppressed. And, at timing F in FIG. 6, (L4+L5)/T2P=1536/1.2=1280 Bwalloc=1333, and since it is within the allowable band, the transmission is allowed. Accordingly, it is possible to provide other communication terminals with transmission vacant polling timing two times (timing B and C in FIG. 5) until occurrence timing of the next L5.

In this manner, in this embodiment, since only processing for one packet is conducted in one processing frame, the processing can be conducted only one time per 100 milliseconds, and a processing load is remarkably reduced. Thereby, a calculator having lower performance can be only applied, and an advantage for reduction of a system realizing cost is effected.

Further, in this embodiment, since a band requested from the communication terminals is calculated based on the equation, a non-uniform characteristic of an occurrence frequency of packets transmitted from the communication terminals can be flexibly handled. That aspect is represented in the time chart after the transmission request of L3=32 octets in FIG. 6.

At timing ⑧–⑨ in FIG. 6, subsequently to periodical transmission requests of 768 octets packets, response packets of 32 octets (L3) are non-periodically requested. Since L3 is a short packet, it immediately becomes to be within a band, and it is promptly transmitted (at timing ⑨ in FIG. 6). Since just the next processing frame is occurrence timing of 768 octets packets which periodically occur, the communication terminal #1 requests transmission (L4) thereof. As a result of a band calculation by means of an equation 3, this is promptly transmitted (at timing A in FIG. 6). Accordingly, it is possible to provide other communication terminals with transmission vacant polling timing two times (timing B and C in FIG. 6) until occurrence timing of the next L5.

In addition, although, in this embodiment, it is assumed that the processing of FIG. 6 is software processing by means of the host computer, that may be constructed by means of hardware.

Also, although, in this embodiment, an averaging interval in the band calculation is assumed over continuous two packets, it can be considered that the averaging interval is assumed to be not the continuous two packets, but continuous three packets, continuous four packets, . . . . As an example, a calculation equation in case of averaging by using the continuous three packets is shown as an equation (2).

$$L(n)+L(n+1)+L(n+2) \leq BWalloc \times T3P \qquad (2)$$

In addition, in the equation (2), BWalloc is the allocated allowable band, L(n) is the n-th packet length, and T3P is a time period until the communication terminal can set the (n+3)-th packet transmission request since it sets the n-th packet transmission request.

According to this example, since communication terminals which have three kinds of packet sources having different occurrence frequencies can be handled, a more flexible arrangement can be realized. In such an arrangement change, since it is widely extensible, an appropriate arrangement corresponding to processing capability of an available data bus control apparatus can be adopted.

Figure 7:
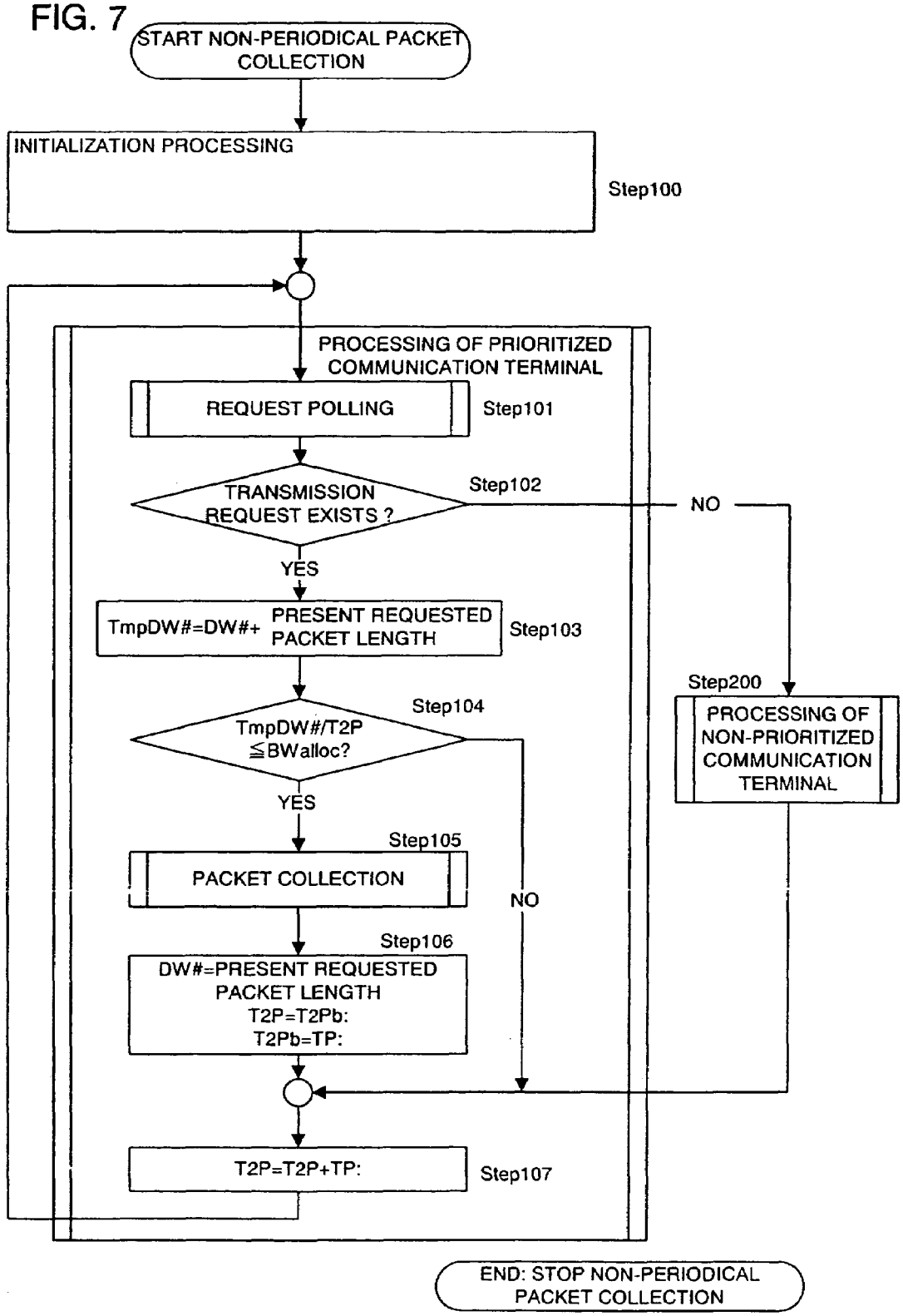

In another embodiment of the present invention, a basic arrangement is the same as the above-described arrangement, and however, in case that requests from the prioritized communication terminals do not exist at the timing of request polling, a further invention is made. A processing flow thereof is shown in FIG. 7. In this figure, in case that packet transmission requests from wire communication terminals do not exist, it is constructed that transmission requests are also acquired from non-prioritized communication terminals in the same processing frame (STEP 200).

In this manner, in another embodiment, since it operates so as to fill up a non-communication time period of a data bus at the utmost, it is possible not only to conduct further efficient communication, but also to adopt an arrangement capable of surely keeping a contracted band for each communication terminal by distinguishing between a prioritized terminal and a non-prioritized terminal for every processing frame.

The present invention effects advantages below.

The first advantage is that a processing load of the data bus control apparatus can be reduced. The reason thereof is that a packet unit is adopted for a transmission unit.

The second advantage is that dispersion of a packet occurrence frequency characteristic of the communication terminals can be efficiently and flexibly accommodated. The reason thereof is that, in the calculation of a communication band for every communication terminal, it is averaged over a plurality of continuous packets.

What is claimed is:

1. A data bus control method for an artificial satellite load, which controls data communication between a plurality of communication terminals and a data bus control apparatus, characterized in that a periodical processing time band during which communication is periodically conducted between the plurality of communication terminals and the data bus control apparatus and a non-periodical processing time band during which communication is non-periodically conducted between said plurality of communication terminals and said data bus control apparatus are provided, and data transmission is conducted at a variable length packet unit during said non-periodical processing time band characterized in that, in case that communication requests from the communication terminals for conducting communication with priority during the non-periodical processing time band do not exist, said non-periodical time band is allocated to communication with other communication terminals.

2. A data bus control method for an artificial satellite load recited in claim 1, characterized in that collection of communication requests (polling) during the non-periodical processing time band from the plurality of communication terminal is time-divisionally conducted.

3. A data bus control method for an artificial satellite load recited in claim 2, characterized in that communication terminals for conducting communication with priority during each non-periodical processing time band are previously determined and a schedule is made out, and based on said schedule, processing of a communication request is conducted.

4. A data bus control method for an artificial satellite load recited in claim 1, characterized in that communication terminals for conducting communication with priority during each non-periodical processing time band are previously determined and a schedule is made out, and based on said schedule, processing of a communication request is conducted.

5. A data bus control method for an artificial satellite load recited in any of claim 1, characterized in that the communication requests from the communication terminals, which are conducted during the non-periodical processing time band, are averaged by a time period during which transmission of a plurality of packets is conducted.

6. A data bus control method for an artificial satellite load, which controls data communication between a plurality of communication terminals and a data bus control apparatus, characterized in that the method comprises steps of:

independently providing a periodical processing time band during which communication is periodically conducted between the plurality of communication terminals and the data bus control apparatus and a non-periodical processing time band during which communication is non-periodically conducted between said plurality of communication terminals and said data bus control apparatus;

allocating an allowable band in said non-periodical processing time band to each communication terminal;

time-dividing collection of communication requests (polling) to each communication terminal during said non-periodical processing time band, and previously determining communication terminals for conducting communication with priority during each non-periodical processing time band and making out a schedule;

conducting collection of communication requests (polling) to communication terminals for conducting communication with priority during said non-periodical processing time band, based on said schedule;

as a result of the collection of the communication requests, in case that the communication requests from the communication terminals exist, allowing transmission if a data content to be transmitted, which is averaged by a time period during which transmission of a plurality of packets is conducted, is below or equal to said allocated allowable band, and suppressing transmission if it is above or equal to said allocated allowable band; and transmitting one variable length packet from the communication terminal in one non-periodical processing time band during which transmission is allowed.

7. A data bus control method for an artificial satellite load recited in claim 6, characterized in that determination of transmission allowance is determined based on an equation below, $$L(n)+L(n+1)+\ldots+L(n+m) \leq BWalloc \times TmP$$

where BWalloc is the allocated allowable band,

L(n) is the n-th packet length, and

Tmp is a time period until the communication terminal can set the (n+m)-th packet transmission request since it sets the n-th packet transmission request.

8. A data bus control method for an artificial satellite load recited in claim 7, further comprises a step of allocating said non-periodical time band to communication with other communication terminals in case that communication requests from the communication terminals for conducting communication with priority during said non-periodical processing time band do not exist.

9. A data bus control method for an artificial satellite load recited in claim 6, further comprises a step of allocating said non-periodical time band to communication with other communication terminals in case that communication requests from the communication terminals for conducting communication with priority during said non-periodical processing time band do not exist.

10. A data bus control system for an artificial satellite load, which controls data communication between a plurality of communication terminals and a data bus control apparatus, characterized in that a periodical processing time band during which communication is periodically conducted between the plurality of communication terminals and the data bus control apparatus and a non-periodical processing time band during which communication is non-periodically conducted between said plurality of communication terminals and said data bus control apparatus are independently provided, and the system comprises:

a schedule table in which numbers of communication terminals for conducting communication with priority during each non-periodical processing time period are described;

means for conducting collection of communication requests (polling) to the communication terminals having the numbers which are described in said schedule table;

control means for, in case that the communication requests from said communication terminals exist, allowing transmission if a data content to be transmitted, which is averaged by a time period during which transmission of a plurality of packets is conducted, is below or equal to an allowable band allocated to said communication terminals, and suppressing transmission if it is above or equal to said allocated allowable band; and means for allowing transmission of one variable length packet during a non-periodical processing time band of said communication terminal in case that the transmission is allowed.

11. A data bus control system for an artificial satellite load recited in claim 10, characterized in that said control means conducts determination based on an equation below, $$L(n)+L(n+1)+\ldots+L(n+m) \leq BWalloc \times TmP$$

where BWalloc is the allocated allowable band,
L(n) is the n-th packet length, and
Tmp is a time period until the communication terminal can set the (n+m)-th packet transmission request since it sets the n-th packet transmission request.

12. A data bus control system for an artificial satellite load recited in claim 10, further comprises means for allocating said non-periodical time band to communication with other communication terminals in case that communication requests from the communication terminals for conducting communication with priority during said non-periodical processing time band do not exist.

* * * * *